United States Patent
Hundertmark et al.

(10) Patent No.: US 6,293,902 B1
(45) Date of Patent: Sep. 25, 2001

(54) WRISTLET MOUNTING MEANS FOR INFANT CARE APPARATUS

(75) Inventors: Peter K. Hundertmark, Laurel; Christopher A. Dykes, Odenton, both of MD (US)

(73) Assignee: Datex-Ohmeda, Inc., Tewksbury, MA (US)

( * ) Notice: Subject to any disclaimer, the term of this patent is extended or adjusted under 35 U.S.C. 154(b) by 0 days.

(21) Appl. No.: 09/503,064

(22) Filed: Feb. 12, 2000

Related U.S. Application Data
(60) Provisional application No. 60/170,280, filed on Dec. 11, 1999.

(51) Int. Cl.[7] .................................................. A61G 11/00
(52) U.S. Cl. ................................................................ 600/22
(58) Field of Search ............................... 600/22; 392/403; 312/1; 52/20; 2/81, 85

(56) References Cited

U.S. PATENT DOCUMENTS 2,695,605 * 11/1954 Gibbon ..................................... 600/22
4,936,824 * 6/1990 Koch et al. ............................. 600/22

* cited by examiner

*Primary Examiner*—John P. Lacyk
*Assistant Examiner*—Nikita R Veniaminov
(74) *Attorney, Agent, or Firm*—Roger M. Rathbun

(57) ABSTRACT

A method is provided for affixing a wristlet to the side of an incubator. The side is a double walled side having an inner wall and an outer wall with a space between those walls. Both the outer and inner walls have handhole openings that are in alignment when the inner and outer walls are affixed together to allow a person to insert an arm through the openings. A flexible handhole is affixed within the opening in the outer wall and extending inwardly toward the incubator interior through the inner wall. That handhole has an annular flange that extends outwardly and a wristlet having an outer peripheral portion having an elastic member is affixed to the handhole by encircling the annular flange. The inner wall is removably affixed with respect to the outer wall and when affixed to the outer wall, the inner wall sandwiches the outer periphery of the wristlet between that inner wall and the annular flange. The wristlet therefore is maintained firmly affixed to the side with out needing a very tight outer elastic member.

7 Claims, 2 Drawing Sheets

WRISTLET MOUNTING MEANS FOR INFANT CARE APPARATUS

RELATED CASES

The present application is based upon Provisional Patent Application Serial No. 60/170,280 filed Dec. 11, 1999.

BACKGROUND

The present invention relates to an infant care apparatus and, more particularly, to an improved means of mounting a wristlet to the wall of an incubator.

In the use of infant incubators, handholes are commonly provided in a wall or door of the apparatus to allow the attending personnel access to the infant without the need to open a large door where there would be created an undesirable effect on the internal environment. With the user of handholes, however, certain procedures can be carried out on the infant with a minimum of disruption to that controlled atmosphere inside the infant compartment within which an infant is positioned.

The handholes themselves normally have doors to access the infant and, when closed, obviously preserve the internal environment. Along with the doors, when opened, there is also commonly used a sleeve or wristlet that comprises a flexible material that is affixed to the inner peripheral edge of the handhole and extends inwardly so as to fairly tightly encircle the hands of the personnel so as to, again, minimize the disruption to the protective internal environment within the infant compartment when procedures are carried out on the infant.

In general, such wristlets are affixed to an external flange surrounding the periphery of the handhole. Such wristlets are commonly retained to that external flange by means of a elastic band the surrounds the external flange. One difficulty of such common wristlets is that the elastic must be relatively tight about the external flange in order to retain the wristlet in position. Otherwise, the continual inserting and withdrawing of the hands through the wristlets that encircles the wrists can cause the wristlet to pull away from the external flange and become loosened from its mounting to the wall of the infant incubator and thus the attending personnel have to keep reinstalling the wristlet to assure it is properly functioning.

Accordingly, to retain the wristlet in position, the elastic must currently be extremely tight about the external flange and, thus, the further problem arises that the user of the extremely tight elastic makes it considerably difficult remove and replace the wristlet for cleaning, replacement ad the like. As such, therefore, the difficulty is in the alternative, the elastic needs to be very tight to retain the wristlet in position, however, as a result, the wristlet is very difficult to remove and/or replace.

Accordingly, it would be desirable to provide a mounting means for a wristlet that securely locks the outside periphery of the wristlet firmly to the structure of the incubator wall so as to assure the continued integrity of the affixation of the wristlet to the incubator wall.

As used herein, therefore, the description will refer to the walls of the incubator, it being understood that by wall, the invention is used commonly employed, as is the handhole, in the door of an incubator and which will be considered a wall for purposes of the following description.

SUMMARY OF THE INVENTION

Accordingly, the present invention relates to a means of securing a wristlet to the wall of an infant incubator. As stated, the use of handholes are common with such apparatus and one handhole is shown and described in U.S. Pat. No. 4,773,392 of Koch. In the present invention, however, the wristlet is particularly adapted for use with a double wall construction of an incubator and a typical double walled incubator is shown and described in U.S. Pat. No. 4,936,824.

In such double wall construction, there is an outer wall and an inner wall and the flow of warmed air flows through the passageway formed between the outer and inner walls to provide heat to the infant. Also as is typical, the inner wall is removable so that the hospital personnel can clean the unit including the passageway for the heated air between the inner and outer walls.

Thus, in carrying out the present invention, there is a double walled incubator wall having an outer wall that may be fixed to the outer rim of the handhole. That handhole rim extends inwardly toward the interior of the incubator and has a further annular flange that is located inwardly toward the interior of the incubator and extends radially outwardly from that flange.

The outer flexible peripheral portion of the wristlet thus is elastic and is stretched over and seated against or around the exterior facing surface of the annular flange. The inner wall of the double wall of the incubator is affixed against the internal facing surface of the annular flange and thus traps the material of the wristlet between the incubator inner wall and the internally facing surface of the annular flange.

Thus, when the inner wall of the double wall construction is installed, the exterior peripheral portion of the wristlet is not only affixed by the elasticity of the wristlet itself, but additionally by being sandwiched between the inner wall of the incubator wall and the internal facing surface of the annular flange. By such means, the wristlet is firmly affixed to the wall of the incubator and not likely to come detached from the wall during its continued use. As an advantage, therefore, the wristlet is not principally affixed by means of the elastic outer peripheral portion so that the wristlet does not require the extremely tight elastic to maintain the wristlet in position affixed to the incubator. As such, the wristlet can be easily installed and removed, yet the wristlet is firmly affixed to its position to the incubator and is not readily disengaged by the act of the user inserting hands withdrawing an arm through the wristlet.

These and other features and advantages of the present invention will become more readily apparent during the following detailed description taken in conjunction with the drawings herein.

DETAILED DESCRIPTION OF THE INVENTION

Figure 1:
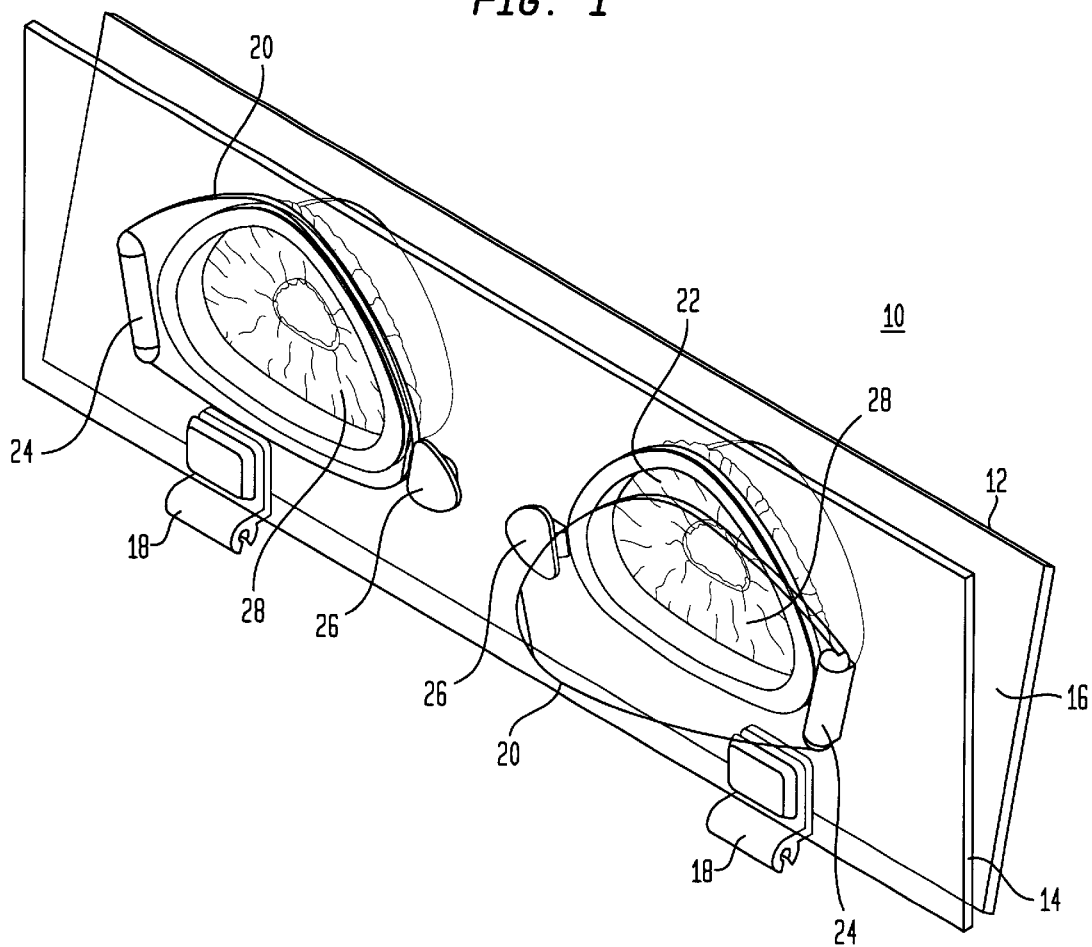
FIG. 1 is a perspective view of a double wall door side of an infant apparatus using the means of attaching a wristlet in accordance with the present invention.

Referring to FIG. 1, there is shown a perspective view of a side 10 of an infant apparatus and which may preferably be an infant incubator. In general, the present invention will be described with respect to a side of an incubator, however, it will also be seen that the side 10 can be a door of the infant incubator, side wall, end wall or the like. For purposes of the present invention, the side 10 may be any side or surrounding surface of the incubator and the incubator itself may be similar to that shown and described in U.S. Pat. No. 4,936,824 of Koch et al where there are a double walls within which the heated air passes to heat the sides and thus reduce the radiant losses of the infant.

Accordingly, returning to Fig., 1, the side 10 has double walls, comprising an inner wall 12 and an outer wall 14, spaced apart such that there is a passage 16 between the walls for the heated air to pass. It may also be seen that the double walls 12 and 14 in the preferred embodiment are, as in the Koch et al patent, used to pass the heated air, however, the present invention is applicable to any double walled side of an apparatus whether or not heated air passes through the interior space between the walls.

Hinges 18 are provided to affix the side 10 to the particular apparatus and the hinges 18 can also serve to support the inner and outer walls 12, 14 and also maintain the proper spacing between those walls. As shown, the inner wall 12 is removable from the side 10 so that the internal surfaces of the side 10 can be cleaned or otherwise maintained. The particular hinge construction for the present invention is not important and the inner wall 12 may be affixed in its desired position to the hinges 18 and removable therefrom by a variety of methods.

Doors 20 can also be located in the outer wall 14 to allow access to the internal area of the incubator by the user and, when closed, the doors 20 close off the opening 22 in the side 10 to maintain the special environment within the infant incubator. As is conventional the doors 20 can be affixed to the side 10 by means of hinges 24 and have latches 26 to maintain the door in their closed positions.

A wristlet 28 is also provided in the opening 22 and is affixed to the side 10 in a manner in accordance with the present invention as will be described.

Figure 2:
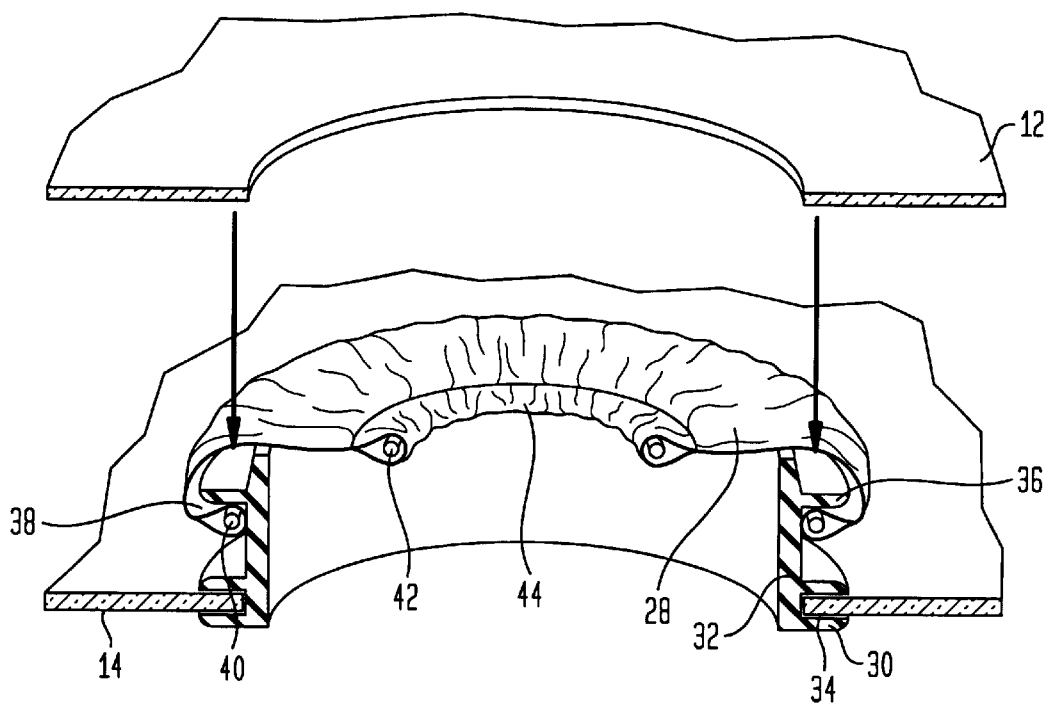
FIG. 2 is an exploded view of the double walled side of FIG. 2.
Figure 3:
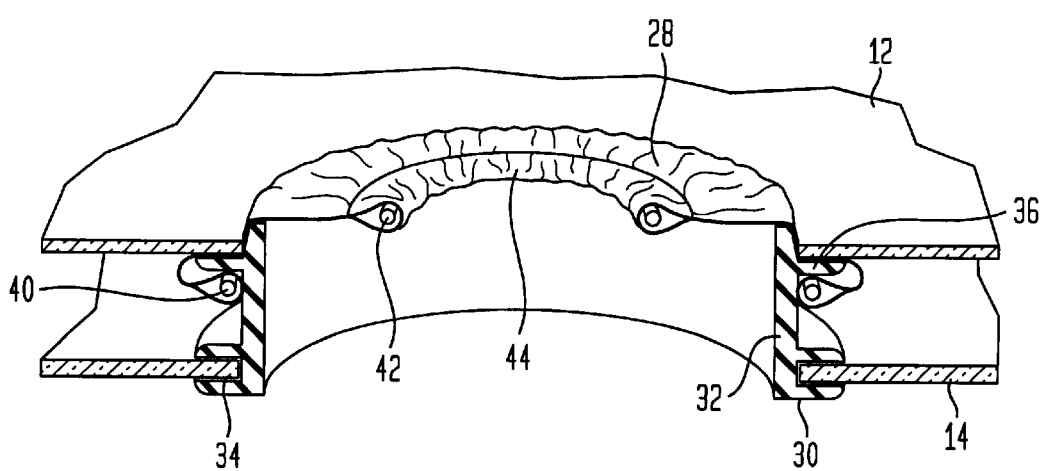
FIG. 3 is a perspective view of a completed assembly of the double wall side of FIG. 1.

Referring now to FIGS. 2 and 3, there is shown an exploded perspective view and a perspective of a completed assembly of a wristlet 28 as it is affixed to the side 10 of an incubator. Again, referring to the Koch et al '824 patent, the outer wall 14 is disposed toward the exterior of the incubator while the inner wall 12 is disposed toward the interior of the incubator. As shown, the outer wall 14 is affixed to an exterior rim 30 of the handhole 32 and the handhole 32 itself is preferably comprised of a flexible silicone material so as to be removable from the side 10 of the incubator. As shown, the outer wall 14 is fitted within an internal annular cavity 34 and thus, with the flexibility of the handhole material, the handhole 32 can be readily removed for cleaning and reinstalled.

The handhole 32 has an annular flange 36 outwardly disposed with respect to the handhole 32 and is located inwardly along the body of the handhole toward the interior of the incubator. As further can be seen, the inner wall 12 is affixed to the side 10 of the incubator such that the surface of the inner wall 12 fits firmly against the interior facing surface of the annular flange 36.

The wristlet 28 has an outer peripheral portion 38 that stretches to fit over the annular flange 36 and against the exterior facing surface of annular flange 36. As is typical of wristlets, the outer peripheral portion 38 is flexible and has an elastic member 40, similar to an O-ring, fitted within the outer peripheral portion 38 of the wristlet 28 so that the wristlet 28 can be affixed to the annular flange 36. As is conventional, an elastic member 42 is also located with the interior portion 44 of the wristlet 38 to allow that interior portion 44 to tightly surround and seal to the wrists or arms of the user as that user attends to the needs of an infant positioned within the incubator.

Thus, in the assembled state of FIG. 2, when the inner wall 12 is affixed in position, it seals the wristlet 28 between the inner wall 12 and the interior facing surface of the annular flange 36. Thus, the wristlet 32 is firmly secured to the side of the incubator and is unlikely to become detached during its use.

Accordingly, by sandwiching the outer peripheral portion 38 of the wristlet 28 between the inner wall 12 and the annular flange 36 of the handhole 32, the wristlet 32 is maintained in position affixed to the side 10 of the incubator without relying upon the elasticity of the outer elastic member 40 and that outer elastic member 40 can be more elastic and yet not encounter the problem of the wristlet 32 coming detached as the user inserts or removes arms through or from the handhole 32.

Those skilled in the art will readily recognize numerous adaptations and modifications which can be made to the wristlet attachment means of the present invention which will result in an improved apparatus, yet all of which will fall within the scope and spirit of the present invention as defined in the following claims. Accordingly, the invention is to be limited only by the following claims and their equivalents.

We claim:

1. A means of affixing a wristlet to a side of an incubator, wherein said side includes a inner wall and an outer wall affixed together to form a space therebetween, said inner wall being removable from said outer wall, said outer wall and said inner wall having openings generally in alignment when said inner and said outer walls are affixed together, and said wristlet includes an outer peripheral portion and an inner portion, said means of affixing comprising a handhole adapted to be affixed to said outer wall surrounding said opening in said outer wall, said handhole having an annular flange extending radially outwardly, said outer peripheral portion of said wristlet adapted to be secured to said annular flange of said handhole, said outer peripheral portion of said wristlet further adapted to be sandwiched between said annular flange of said handhole and said inner wall when said inner wall is affixed to said outer wall.

2. A means of affixing a wristlet to a side of an incubator as described in claim 1 wherein said outer peripheral portion of said wristlet includes an elastic member to allow said wristlet to fit over said annular flange.

3. A means of affixing a wristlet to a side of an incubator as described in claim 2 wherein said side further comprises at least one hinge to affix the side to an incubator.

4. A means of affixing a wristlet to a side of an incubator as described in claim 3 wherein said at least one hinge secure said inner wall and said outer wall with respect to each other.

5. A side for use with an infant incubator having an interior, said side comprising an inner wall and an outer wall affixed together to form a space therebetween, said inner wall being removable from said outer wall, an opening in said inner wall and an opening in said outer wall, said opening in alignment when said inner and said outer wall are affixed together, a handhole affixed to said outer wall and surrounding said opening in said outer wall and extending inwardly toward the interior of the infant incubator, an annular flange extending outwardly from said handhole, a wristlet having an outer peripheral portion adapted to encircle said annular flange to be retained to said annular flange, said inner wall sandwiching said outer peripheral portion of said handhole between said inner wall and said annular flange to retain said wristlet to said handhole.

6. A side for use with an infant incubator as defined in claim 5 wherein said side includes at least one hinge and said side is a door for the incubator.

7. A side for use with an infant incubator as defined in claim 6 wherein said at least one hinge secures said inner wall and said outer wall together.

* * * * *